United States Patent [19]
von Böckh

[11] Patent Number: 4,738,585
[45] Date of Patent: Apr. 19, 1988

[54] HIGH-SPEED WATER SEPARATOR

[75] Inventor: Peter von Böckh, Riniken, Switzerland

[73] Assignee: BBC Brown, Boveri & Company, Ltd., Baden, Switzerland

[21] Appl. No.: 942,768

[22] Filed: Dec. 17, 1986

[30] Foreign Application Priority Data

Jan. 15, 1986 [CH] Switzerland ............................ 131/86

[51] Int. Cl.[4] .............................................. B01D 45/08
[52] U.S. Cl. .................................. 415/115; 415/121 A
[58] Field of Search .................... 415/121 A, 168, 115

[56] References Cited

U.S. PATENT DOCUMENTS 4,581,048 4/1986 Svoboda .

FOREIGN PATENT DOCUMENTS 0096916 5/1983 European Pat. Off. .
321682 6/1902 France .
2384103 10/1978 France ........................... 415/121 A
1066872 10/1963 United Kingdom .
1072483 3/1964 United Kingdom .
1195017 11/1985 U.S.S.R. ......................... 415/121 A Primary Examiner—Larry I. Schwartz
Attorney, Agent, or Firm—Burns, Doane, Swecker & Mathis

[57] ABSTRACT

The high-speed separator has a blade row (2) in the bend plane of a pipe elbow (3). The pressure side of the hollow deflection blades (5) has rows of suction openings (6, 7) which are covered by cover strips (8, 9) and through which condensate and transport steam are drawn off into the inside of the blade and pass further via channels (24, 26) in the deflection blades (5) and via an outer housing (11) into a channel (25) of the blades (5), from where the transport steam freed of condensate is drawn off into the main steam flow through rows of suction openings (15) at the suction side of the blades which are likewise covered by cover strips (16).

6 Claims, 3 Drawing Sheets

HIGH-SPEED WATER SEPARATOR

The present invention relates to a high-speed water separator and more particularly to water separators which recirculate steam therethrough.

BACKGROUND OF THE INVENTION

In a steam-turbine power station, such water separators have the task of separating in a steam line, in particular before the low-pressure part of the turbine, the water contained in the steam, since when steam is too wet the water drops could cause severe erosion damage to the blading.

Water separators for this purpose are known, for example, from Swiss patent specifications Nos. 440,330 and 621,490. The principle of separation is based on the fact that the steam flow is sharply deflected, usually through 90°, in a pipe elbow, in the bend plane of which a row of hollow, curved deflection blades are provided, with the water drops accumulating on the concave blade sides and the water film thus formed being drawn off into the hollow inside of the blade via gaps at the blade outlet edges and/or at the concave blade sides. In these embodiments, if a large amount of water collects locally or if water collects over a considerable time, a portion of the water film can build up at the gap openings and be entrained into the turbine by the steam flow.

A water separator which avoids this disadvantage is described in European patent application No. 0,096,916. In this water separator, in an otherwise identical arrangement of the row of blades, two rows of bores are provided at the concave blade sides, one in the center and one at the outlet edge of the blades, through which the water film is likewise drawn off into a space of lower pressure. To avoid the entrainment of the water film, cover strips are provided which extend at a distance from the bore rows over their entire length and the rear edge of which, as viewed in the flow direction, is connected in a sealing manner downstream of the bores to the concave side of the respective blade, for example by welding, whereas the front edge, with the concave blade side, forms an inlet gap for the deposited water film, through which the latter is forced into the long, wedge-shaped pocket defined by the cover strip and the concave blade side and is drawn off there via the bore rows. If a large amount of water collects, the water film builds up in the said long pocket without it being possible for a portion of the water to be entrained by the steam.

The suction effect at the bore rows results from the inner space of the deflection blades being connected via their open end faces to an outer housing surrounding the abovementioned pipe elbow, in which outer housing the condensate is separated from the steam, so-called transport steam, which unavoidably passes with the condensate into this outer housing and is fed via an exhaust-steam connecting piece to a point in the steam circuit at which a lower pressure prevails than at the concave side of the deflection blades.

An external pipe is required for discharging the above-mentioned transport steam to the place of application. It has been shown that such a pipe is generally more expensive than the separator itself. This economic aspect has recently been a factor in the reequipping of existing plants, that is replacing obsolete separators, or separators requiring overhaul, by such a newer and more effective type of construction, while power station operators, because of the high costs of the pipe of a separator of the last-mentioned type of construction, decide in favour of a reconstruction of the existing water separator, which reconstruction is slightly cheaper overall, even if less efficient.

OBJECT AND SUMMARY

An object of the present invention is to avoid the disadvantages of the abovementioned, in particular the external pipe construction of high-speed water separators. That is, to create a separator in which the transport steam within the separator itself is fed back again to the circuit of the working steam. The external pipe thereby becomes superfluous, and the separator becoms substantially less expensive and therefore also becomes of interest with regard to the price for the reequipping of existing plants.

DESCRIPTION OF THE DRAWINGS

The invention is described below with reference to exemplary embodiments shown in the drawing, in which.

DETAILED DESCRIPTION

The arrows in the various figures indicate the flow direction of the working medium steam. Apart from the housing of the separator, only the elements which are essential for understanding the invention are shown; the local arrangement of the water separator in the steam turbine plant is not shown either. As a rule, water separators of the type relevant to the subject matter are provided between the high-pressure and the low-pressure part of the plant.

Figure 1:
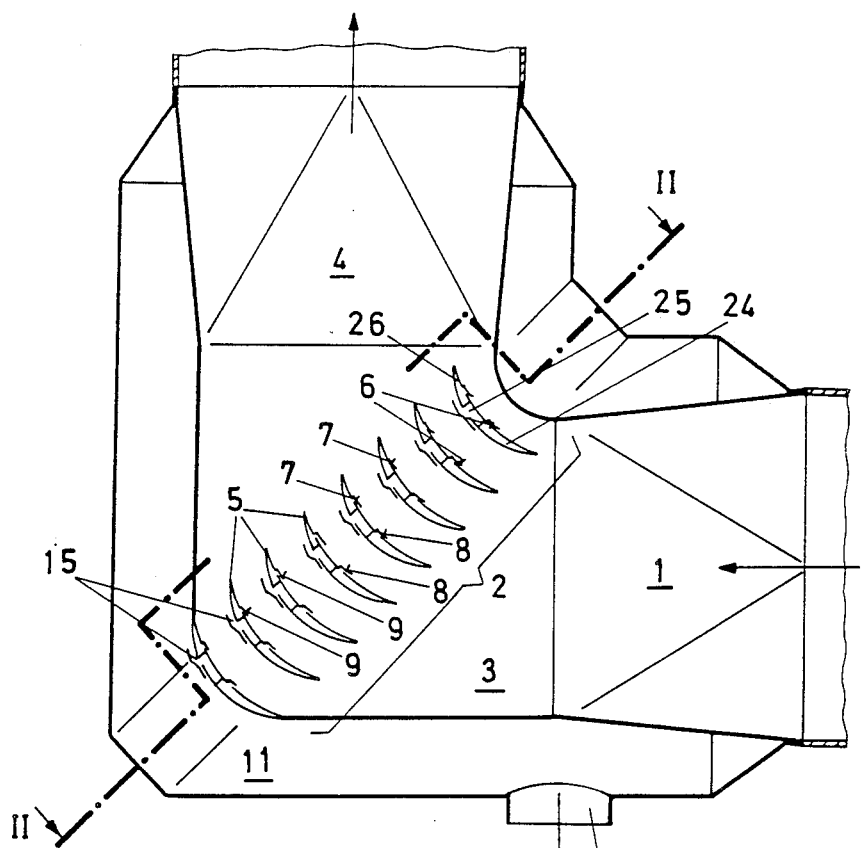
FIG. 1 is a diagrammatic view in a vertical longitudinal cross-section illustrating the construction of a high-speed water separator according to the invention.
Figure 2:
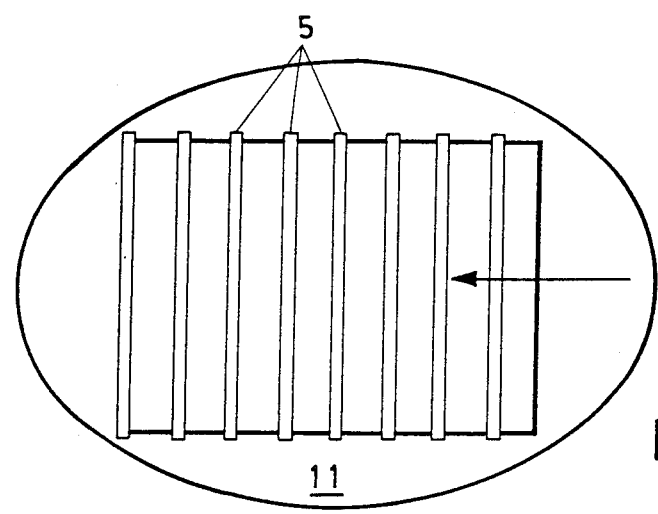
FIG. 2 is a cross-sectional view through the same along the section line II—II plotted in FIG. 1.

According to FIG. 1, the steam, which is saturated steam before the low-pressure part, flows through a horizontal steam feedline 1 into the separator, after passing a blade row 2 in a pipe elbow 3 is deflected upward at right angles into a perpendicular steam-exhaust line 4 and flows from there to the turbine (not shown). The blade row 2 extends in the bend plane of the pipe elbow 3 diagonally through the latter and consists of a row of hollow, circular-profiled deflection blades 5, on the concave pressure side of which, a row of suction openings 6 and 7 is provided in each case in known manner in the center area and in the end area, as viewed in the flow direction. The rows of suction openings 6 and 7 are covered over their entire length with cover strips 8 and 9, the rear edge of which, as viewed in the flow direction, is connected in a sealing manner to the concave blade side, preferably by welding, and the front edge of which and the edge located above the openings are fixed by spacers 10, see FIGS. 4 and 5, at a distance from the blade, so that the condensation film located on the concave blade side, with an unavoidable portion of transport steam, is forced into the long wedge-shaped channel thus formed and drawn off there through the openings 6 and 7 into the inside of the blades. The condensate passes through the two open end faces of the blades 5 into an outer housing 11, from where it is extracted in known manner through a water-drain connecting piece 12 and fed back again into a feed-water tank.

The construction described so far corresponds to the prior art, as revealed in the last cited patent literature. As mentioned at the outset, suction is achieved there by the outer housing 11 being connected via a pipe to a point in the steam circuit at which a lower pressure prevails than in the housing 11. Since the latter communicates with the blade hollow space via the deflection blade end faces open on both sides, the water/steam mixture is drawnoff into the housing 11, where the water entrained by the steam collects at the bottom by gravitational force and is fed to the feed water through the water-drain connecting piece 12 in the housing 11, while the steam is discharged from the upper part of the housing through the above-mentioned pipe which is to be made superfluous as a result of the present invention.

Figure 3:
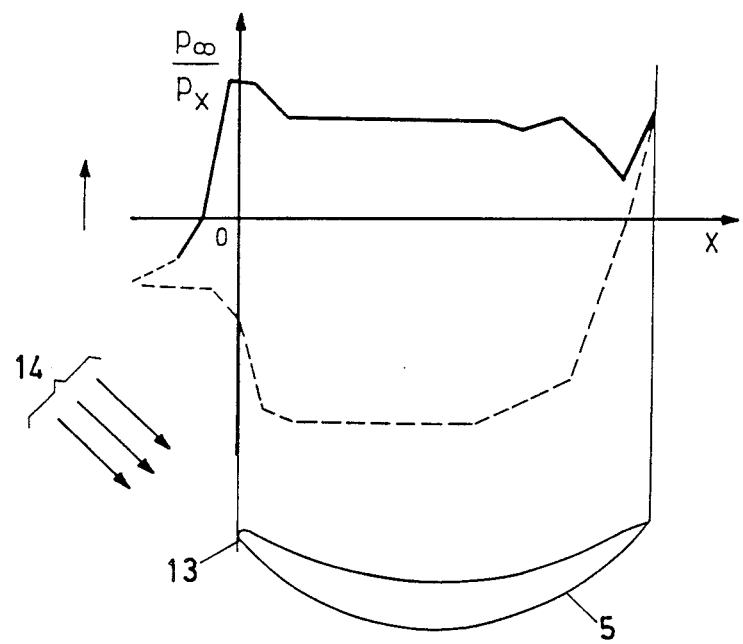
FIG. 3 is a graphic view illustrating the distribution of the static pressure on the blade surface.

According to the present invention, the pressure differential between the concave and the convex profile contours of the deflection blades 5 is used as the source of the suction effect. FIG. 3 shows, as a function of the distance from the profile front edge 13, the pressure curves at the two profile contours, namely as a ratio $p_{oo}/p_x$, wherein $p_{oo}$ denotes the static pressure in the undisturbed flow outside the disturbance area of the profile and $p_x$ denotes the static pressure. The oncoming flow is indicated by the flow arrows 14. The solid line which runs above the abscissa represents the positive pressure relative to $p_{oo}$ at the concave profile contour and the broken curve beneath the abscissa represents the vacuum relative to $p_{oo}$, which vacuum prevails at the convex profile contour. These are calculated curves under the assumption that there is no friction.

Figure 6:
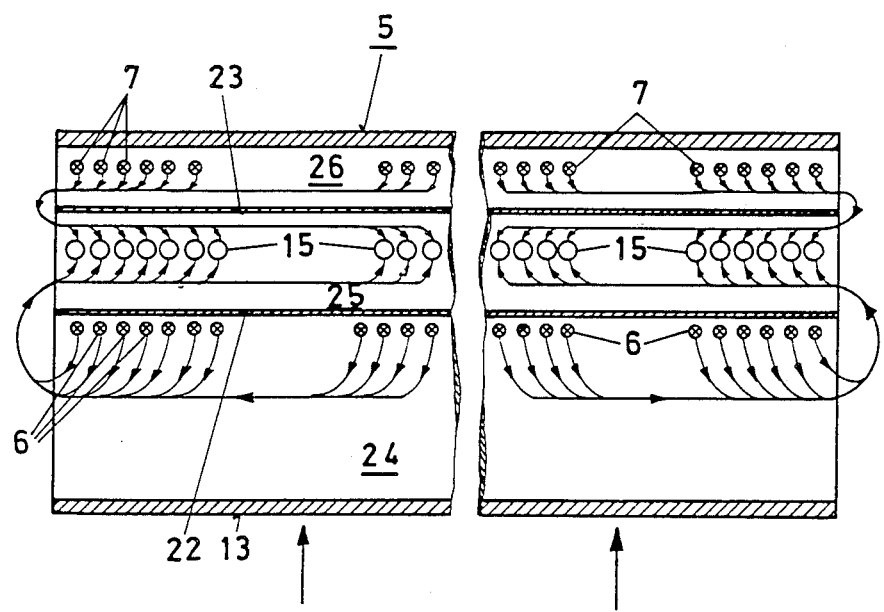
FIG. 6 is a cross-sectional view through the blade according to FIG. 4 along the section line VI—VI plotted in FIG. 6, but with there being no conformity in scale between these two figures.
Figures 4, 5:
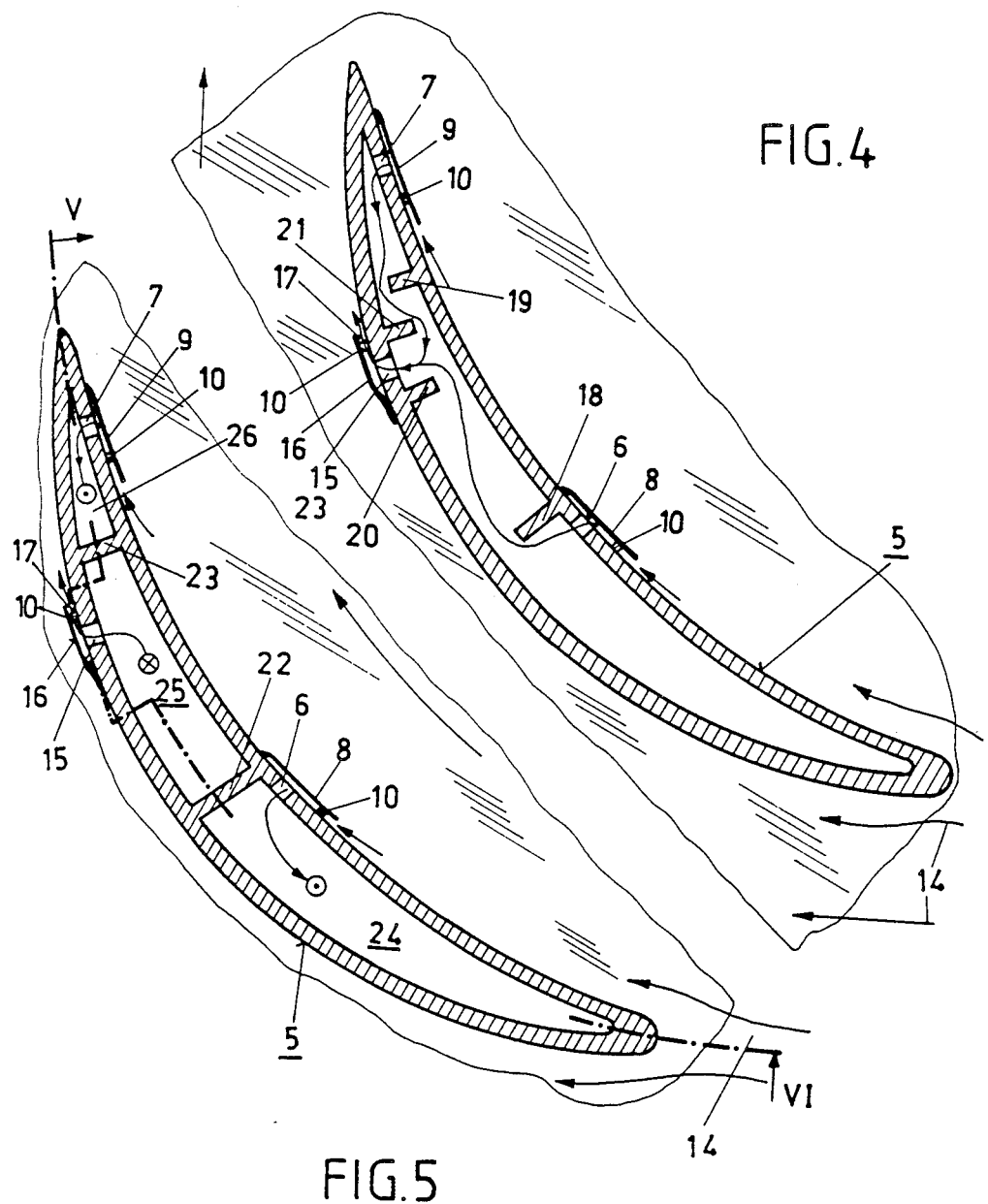
FIGS. 4 and 5 are cross-sectional views of two embodiments of deflection blades.

The pressure differential between the concave and the convex profile contour is utilized by the measures shown in FIGS. 4 to 6 for drawing off and separating the water-steam phases. In the embodiment according to FIG. 4, which shows a cross-section through a deflection blade 5, a row of suction openings 15, in the area between the rows of suction openings 6 and 7, which rows are provided on the concave pressure side of the blade, is located on the convex suction side of the blade, which suction openings 15 are likewise uniformly distributed over the entire blade length and are likewise covered by a cover strip 16, the front edge of which, as viewed in the flow direction, is connected gap-free over the entire length to the suction side of the blade, and the rear edge of which is at a distance from the suction side of the blade and forms a gap 17 with this suction side. Like the cover strips 8 and 9 on the pressure side, the cover strip 16 on the suction side, for maintaining the gap width and for damping vibration excitation, is also fixed to the blade wall on the suction side by a row of spacers 10 in the form of rivets or screws with a distance element, double-rivet pins or the like. The cross-section of the suction openings 15 on the suction side should be approximately the same as the sum of the cross-sections of the suction openings 6 and 7 on the pressure side to prevent a build-up in front of the former.

The embodiment according to FIG. 4 is especially suitable for separators with vertical deflection blades. Sufficient for this purpose are deflection ribs 18 and 19 inside the wall on the pressure side and deflection ribs 20 and 21 inside the wall on the suction side, which deflection ribs extend over the entire blade length. They deflect the drawn-off flow in the hollow space of the blade, with the water drops precipitating practically completely on the inner peripheries as a result of the centrifugal force, and with this condensation film flowing off downward into the outer housing 11 from where the condensate is extracted through the water-drain connecting piece and fed back again to the circuit.

In a horizontal blade arrangement, the embodiment according to FIGS. 5 and 6 having inner dividing walls 22 and 23 is recommended, which dividing walls 22 and 23 subdivide the hollow space of the blade into three channels 24, 25 and 26 which are separated from one another but communicate with one another via their end faces open on both sides and via the outer housing 11. FIG. 6 approximately corresponds, though not to scale, to the section line VI—VI plotted in FIG. 5. From the suction opening 6 and 7 in the blade wall, concave as viewed from the outside, the water/steam mixture flows into the channels 24 and 26 and on both sides in a mirror-inverted manner outwards through the end faces into the outer housing 11 from where the steam alone, after the water has been separated out partly in the channels and partly in the outer housing, is likewise deflected in a mirror-inverted manner into the center channel 25 and is drawn out through the suction openings 15 in the suction-side wall of the blade into the main steam flow and passes via the steam-exhaust line 4 into the turbine.

Accordingly, in a water separator according to the invention, no changes are necessary to the steam line system 1-3-4. The present separator therefore differs from the type which comes closest to it in construction essentially as a result of the suction openings and the associated cover strip on the suction side of the blade. However, from this apparently slight modification results the great advantage that the external pipe for the discharge of the transport steam becomes superfluous, which, apart from considerably lower initial costs, also results in lower heat and flow losses and therefore a higher overall efficiency of the plant.

Apart from the embodiments shown in FIGS. 4 and 5 of the deflection blades 5 with only one row of suction openings 15 on the suction side, such embodiments having two or more rows of suction openings 15 are also possible. This also applies by analogy to the suction openings 6 and 7 on the pressure side of the deflection blades. Accordingly, additional dividing walls or deflection ribs also ought to be provided inside the blade. While this specification has been illustrated and described in accordance with a preferred embodiment, it is recognized that variations and changes may be made therein without departing from the invention as set forth in the claims.

What is claimed is:

1. A high-speed water separator for separating a condensate in a steam power plant, in which an outer housing surrounds a pipe elbow which is connected to a steam-inlet line and a steam-exhaust line, said pipe elbow including a bend plane and containing in said bend plane a blade row having hollow deflection blades which have a concave pressure side and convex suction side and are formed so as to deflect the steam coming from the steam-inlet line into the steam line, with the concave pressure side of the deflection blades having rows of suction openings which extend over the entire length of the deflection blades and are covered in each case by a cover strip at a distance perpendicular to the pressure side, which distance is fixed by spacers, with the upstream edges of the cover strips, with the pressure side, defining a suction slot directed against the direction of the steam flow, and the downstream edges of the cover strips being connected in a sealing manner to the pressure side of the deflection blades, and with the suction openings, via the hollow inside of the blade, communicating with the outer housing which surrounds the pipe elbow and has a water-drain connecting piece for the condensate to be separated, wherein the convex suction side of the deflection blades 1 has at least one row of suction openings which communicate with the inside of the blade and extend over the entire length of the deflection blades and are covered in each case by a cover strip at a distance perpendicular to the suction side, wherein this distance is fixed by spacers, wherein the downstream edges of the cover strips define a suction gap, wherein the upstream edges of the cover strips are connected in sealing manner to the suction side, and wherein baffle elements are present in the inside of the blade, which baffle elements, in order to separate the condensate, extend the flow path of the transport steam drawn in through the suction openings on the pressure-side of the deflection blades into the inside of the blades and drawn out into the steam-exhaust line through the suction openings located on the suction side.

2. The high-speed water separator as claimed in claim 1, wherein the baffle elements, for extending the flow path of the transport steam, are deflection ribs which extends from the pressure-side and the suction-side blade walls into the inside of the blade and over the entire blade length.

3. The high-speed water separator as claimed in claim 1, wherein the baffle elements, for extending the flow path of the transport steam, are dividing walls which extend over the entire blade length and subdivide the inside of the blade into a number of channels, the end faces of which communicate with the outer housing.

4. A high-speed water separator comprising:
means for feeding saturated steam into a separator after passing a blade row in a pipe elbow, said steam being deflected at a right angle into a perpendicular steam-exhaust line, the blade row extending into a bend plane of the elbow diagonally through the elbow, said blade row including a row of hollow, circular profiled deflection blades having a concave pressure side including first and second rows of suction openings formed in the concave side and a cover strip covering each of said first and second rows, said cover strip attached to said concave side sufficient to permit fluid to flow through said suction openings from outside said blades into said hollow blades; and a third row of suction openings formed in a convex side of said hollow blades and a cover strip covering said third row and attached to said convex side sufficient to limit fluid flow through said third row suction openings from outside said blades into said blades and to permit fluid to flow through said third row suction openings from inside said blades to outside said blades.

5. The water separator of claim 4, including:
means within said hollow blades for forming an extended flow path for fluid forming through said hollow blade.

6. The water separator of claim 5, wherein said means forming an extending flow path includes buffers.

* * * * *